B. F. ALLEN.
Fish-Hooks.

No. 141,910.

Patented August 19, 1873.

Attest
D. Howe
J. C. Wildman

Inventor
Benj. F. Allen
per A. H. & R. K. Evans
Att'ys

UNITED STATES PATENT OFFICE.

BENJAMIN F. ALLEN, OF BOSTON, MASSACHUSETTS.

IMPROVEMENT IN FISH-HOOKS.

Specification forming part of Letters Patent No. 141,910, dated August 19, 1873; application filed July 10, 1873.

*To all whom it may concern:*

Be it known that I, BENJAMIN F. ALLEN, of the city of Boston and State of Massachusetts, have invented a new and Improved Fish-Hook, of which the following is a clear, full, and exact description, reference being had to the accompanying drawings, in which—

Figure 1:
Figure 2:
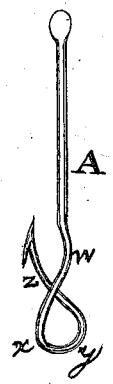
Figure 3:

Figure 1 represents my hook with the barb in front of the shank. Fig. 2 represents the same with the barb in the rear of the shank. Fig. 3 presents an angular diagram, showing the principle or theory of the construction of the hook.

My invention has reference more particularly to the class of hooks used for catching fish with a line and bait; and consists in the peculiar manner in which the hook is bent.

To enable others skilled in the art to make and use my invention, I will proceed to describe the exact manner in which I have carried it out.

The shank of the hook A is made in the ordinary form, but the lower portion is so bent that, when the hook is held with the point toward the eye and the shank in a vertical position, the bend of the hook will describe a cross or figure of 8. (See Fig. 1.) The bend W nearest the shank is nearly at right angles to the point or last bend Z below the barb, while the point from the barb is brought to a position parallel with the shank of the hook, or the line to which it is attached.

By numerous experiments it has been ascertained that a hook thus constructed is almost certain to catch every fish that bites, while the strain upon the barb is lateral, and less likely to break the hook.

Having thus explained my invention, what I claim as new, and desire to secure by Letters Patent, is—

The fish-hook A, provided with the quadruple bends W X Z Y, substantially as herein described and shown.

BENJAMIN F. ALLEN.

Witnesses:
JAMES M. PURINTON,
HORACE D. PURINTON.